Jan. 23, 1951          J. B. HUNTER          2,538,870
DEWAXING HYDROCARBON OIL WITH VORTEX SEPARATOR
Filed Sept. 8, 1947
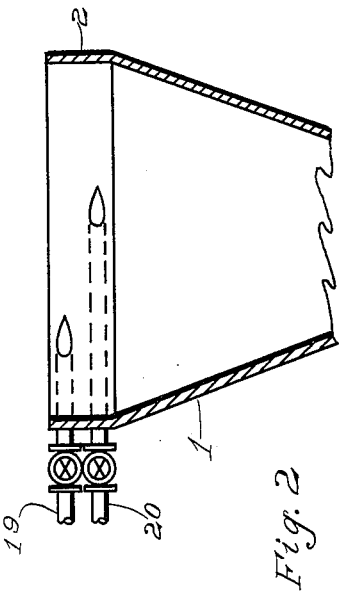
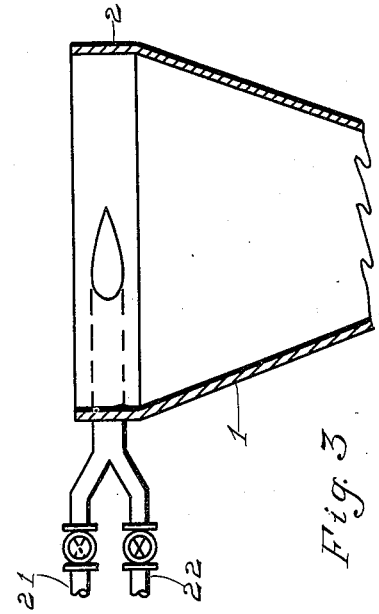
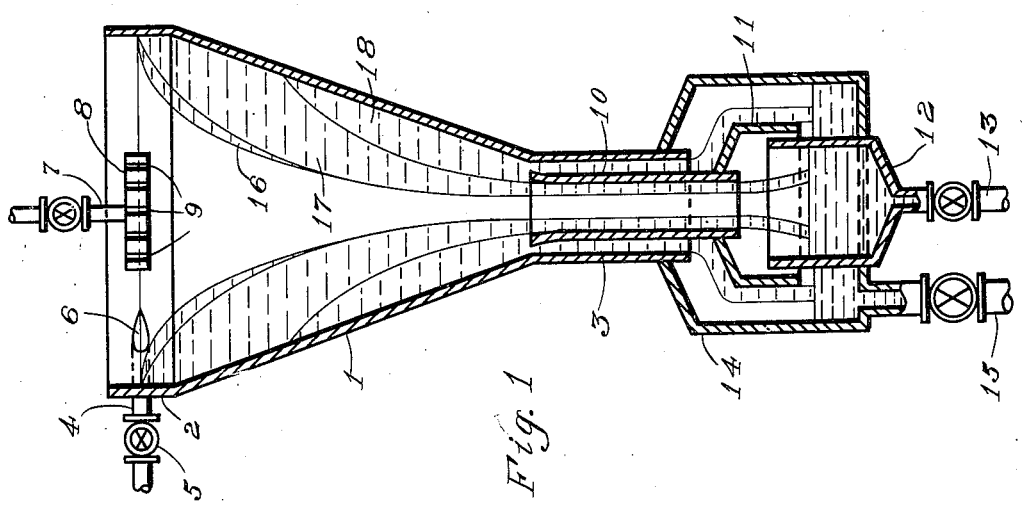
ATTEST
John G. Butz
INVENTOR.
James B. Hunter
BY Norbert E. Birch
Attorney Patented Jan. 23, 1951

2,538,870

UNITED STATES PATENT OFFICE 2,538,870

DEWAXING HYDROCARBON OIL WITH VORTEX SEPARATOR

James B. Hunter, Havertown, Pa., assignor to The Atlantic Refining Company, Philadelphia, Pa., a corporation of Pennsylvania Application September 8, 1947, Serial No. 772,843

8 Claims. (Cl. 196—19)

The present invention relates to the separation of hydrocarbon oil-wax mixtures into components, and relates more particularly to the dewaxing of hydrocarbon oil employing the centrifugal effect obtained in a whirling liquid vortex.

Heretofore, it has been conventional practice to employ high speed centrifuges for the removal of wax from certain types of waxy hydrocarbon oils. Such centrifuges were of the imperforate bowl construction having a high speed rotor, and in addition to their limited capacity, were subject to breakdown due to wear, plugging with wax, and other difficulties.

However, in accordance with the present invention, it has been found possible to obtain the effect of a centrifuge without resort to apparatus requiring high speed rotors, while at the same time increasing the volume of oil dewaxed per separator unit.

Briefly, the process of the present invention makes use of the centrifugal force obtainable through the medium of a free falling liquid vortex, such force being applied in such a manner as to effect a relatively clean separation of the crystallized wax from the oil. The process comprises continuously introducing tangentially into the upper portion of a confined zone, such as a cylindrical or conical vessel terminating at its lower end in a constricted passage or throat, an aqueous solution of a wetting agent and an immiscible organic solvent containing oil and crystallized wax, forming a free falling whirling vortex the angular velocity of which is sufficient to cause the solvent and oil to pass outwardly through the aqueous solution leaving the wax in the aqueous solution, and separately withdrawing from the lower portion of the confined zone, the aqueous solution containing the wax, and the solvent containing the oil, the withdrawal being continuous and at the same rate as the rate of charge. When the oil solution has a greater specific gravity than the aqueous solution, the oil solution will migrate to the periphery of the confined zone and will be withdrawn from the periphery of the throat, while the aqueous solution and wax, being of lower specific gravity will migrate toward the center of the vortex and may be separately withdrawn from the central portion of the throat. Alternatively, when the specific gravity of the oil solution is less than that of the aqueous solution, the reverse will be true. The introduction of the aqueous solution and of the oil solution containing crystallized wax into the upper portion of the confined zone is preferably tangential to the periphery thereof in order to impart to the fluids an initial angular velocity or impetus, and the aqueous solution and the oil solution may be introduced separately or in admixture.

The present invention may be further understood with reference to the accompanying drawing which illustrates apparatus suitable for carrying out the process.

Figure 1 shows, partly in cross section, a vortex separator having a tangential inlet for introducing one of the fluids, and a central inlet for separately introducing the second fluid.

Figure 2 shows a modification of the apparatus of Fig. 1, with separate inlet means for the two fluids at the periphery of the separator.

Figure 3 shows another modification of the apparatus in Figure 1, with a common inlet for both fluids at the periphery of the separator.

Referring to Figure 1, there is provided a conical vessel 1 with a cylindrical upper section 2 and a cylindrical lower section or throat 3 of restricted cross section. Affixed tangentially to the cylindrical upper section 2 is a fluid inlet pipe 4 controlled by valve 5, and communicating with the separator at the aperture 6. Disposed centrally of the cylindrical upper section 2 is a second fluid inlet comprising valve-controlled pipe 7 terminating in a cylindrical drum 8 provided with a plurality of slots 9 constructed to introduce the second fluid tangentially into the upper section of the separator. Concentrically disposed within the throat 3 is a conduit or tube 10 to the lower end of which is attached a housing 11 which shields the fluid receiver 12 provided with valve-controlled drawoff pipe 13. Attached to the lower end of the cylindrical throat 3 is a second fluid receiver 14 which surrounds receiver 12. The second receiver 14 is provided with a valve-controlled drawoff pipe 15.

In operation, an aqueous solution of a wetting agent, at the desired dewaxing temperature, is continuously pumped through pipe 4 and aperture 6 into the cylindrical upper section 2 of separator 1 at such a rate that there is formed a free falling whirling vortex within the separator. At this stage, the aqueous solution may occupy the entire annular space between the wall of the separator and the generally conical void in the center of the vortex. An immiscible organic solvent containing dissolved oil and crystallized wax is then continuously pumped, at the desired dewaxing temperature, through valve-controlled inlet pipe 7 into drum 8, and is discharged therefrom through slots 9 tangentially into the upper portion of separator 1. In this case, the specific gravity of the oil solution containing crystallized wax is greater than that of the aqueous solution, and immediately upon introduction into the separator, forms a layer 16 upon the aqueous solution 17. Due to the centrifugal action of the free falling vortex, the oil solution containing crystallized wax soon attains an angular velocity sufficiently great to cause the oil solution and wax to penetrate the aqueous solution interface. The presence of the wetting agent functions to lower the interfacial tension and thus expedites the transfer of the wax from the oil solution into the aqueous solution. The oil solution, being of higher specific gravity than the aqueous solution, eventually migrates through the aqueous solution and reaches the wall of the separator, thus forming a layer 18. The wax, having a lower specific gravity than the aqueous solution, remains therein and tends to migrate toward the free surface of the aqueous solution, i. e., that nearest the center of the vortex. Thus, as the operation proceeds, an equilibrium of liquid phases is set up, and with proper adjustment of the rate of supply of aqueous solution and oil solution with respect to the height of the separator, the diameter of the upper section of the separator and of the throat, and the diameter of conduit or tube 10, a separation of the liquid phases may be achieved. The aqueous solution containing the crystallized wax is parted from the oil solution by means of tube 10, the former passing downwardly along the inner wall of the tube and discharging into receiver 12, and the latter passing downwardly through the annular space between throat 3 and tube 10 into receiver 14. The aqueous solution containing the crystallized wax, and possibly minor portions of entrained oil solution, is drawn from receiver 12 through valve controlled pipe 13, and may be delivered to a gravity separator (not shown) to permit stratification and removal of entrained oil solution, or may be heated sufficiently to melt and coagulate the wax which may then be decanted or otherwise separated from the aqueous solution. Alternatively, the crystallized wax may be freed of aqueous solution by filtration. Should the wax retain small amounts of organic solvent, the latter may be removed by steam stripping or by vaporization at atmospheric or reduced pressure. The aqueous solution, of course, may be re-cycled to pipe 4 for reuse. The oil solution accumulated in receiver 14 may be drawn therefrom by means of valve-controlled pipe 15, and should it contain minor amounts of entrained aqueous solution, may be delivered to a gravity separator (not shown) to permit stratification and removal of the aqueous solution. The final oil solution may then be heated under reduced pressure to recover the solvent, or the solution may be fractionally distilled to accomplish the same purpose. The recovered solvent may be re-cycled for reuse in diluting additional quantities of oil to be dewaxed.

Alternatively, the system above described may be operated in reverse when the specific gravity of the oil solution is lower than that of the aqueous solution. In such case the oil solution containing crystallized wax may be introduced through pipe 4 and the aqueous solution of wetting agent through valve-controlled pipe 7. In operation, the oil solution will migrate toward the center of the free falling vortex, while the aqueous solution will migrate toward the periphery of the separator, the crystallized wax being retained as a suspension in the aqueous solution. The oil solution will be removed through tube 10, receiver 12, and valve-controlled pipe 13, while the aqueous solution and wax will pass through the annular space between throat 3 and tube 10 into receiver 14, and may be drawn therefrom by valve-controlled pipe 15. The separation and recovery of the solvent from the oil, and of the wax from the aqueous solution may then be effected as described hereinbefore.

In the modification of the apparatus shown in Figure 2, the fluids may be separately introduced tangentially into the cylindrical upper section 2 of separator 1. For example, the aqueous solution of wetting agent may be charged through valve-controlled pipe 19 and the oil solution containing crystallized wax through valve-controlled pipe 20.

In Figure 3, the two fluids may be introduced simultaneously through converging valve-controlled pipes 21 and 22. In the apparatus shown in Figures 2 and 3, an equilibrium will be set up between the liquid phases, and depending upon their respective specific gravities, either the aqueous solution or the oil solution may be drawn from the bottom of the separator at the periphery of the throat.

The dewaxing operation may be carried out using a volume ratio of aqueous solution to oil solution and wax between 1 and 10 to 1. The wetting agent employed may range from 0.01% to 5%, and preferably from 0.05% to 2% by weight of the aqueous solution. Such agents include the nonionic type exemplified by the glycol esters and polyglycol ethers, i. e., the monostearates, oleates, myristates, palmitates, ricinoleates, laurates, and caprates of ethylene glycol, propylene glycol, butylene glycol, diethylene glycol, polyethylene glycol, and glycerol. The polyglycol ethers include those obtained by reacting an alcohol, or glycol, or polyglycol with ethylene oxide to introduce the radical $$-(CH_2CH_2O-)_x$$

where $x$ ranges from 2 to 50 (U. S. Patents 1,970,578 and 1,976,677). Other ethers are exemplified by the reaction products of phenol or an alkylated phenol with ethylene oxide, and may be prepared according to U. S. Patents 2,075,018 and 2,213,477. The alkyl group may be straight or branched chain containing from 2 to 12 carbon atoms, and the ether groups $-(CH_2CH_2O-)$ may range from 2 to 100.

The anionic type wetting agents include the alkali metal and ammonium salts of the higher fatty acids of from 10 to 18 carbon atoms, oxidized wax acids, rosin, and naphthenic acids, the aliphatic and aromatic sulfates and sulfonates, particularly petroleum sulfonates and alkylated aryl sulfonates having alkyl groups of from 8 to 16 carbon atoms, and the sulfates of the aliphatic and aromatic polyglycol ethers (U. S. Patents 1,931,962; 2,083,482; 2,143,759; 2,167,326; and 2,203,883).

The cationic type wetting agents are represented by the quaternary ammonium halides which may be produced by reacting benzyl chloride or alkylated benzyl chlorides containing alkyl groups of from 8 to 16 carbon atoms with aliphatic or aromatic amines, or mixtures thereof. For example, benzyl chloride may be alkylated with an olefin such as nonylene, and the resulting nonyl benzyl chloride may then be reacted with an alkylamine or a hydroxyalkylamine such as diethanolamine to form the quaternary ammonium halide.

In order to obtain an increased specific gravity differential, increased wetting action, and a lowering of the freezing point of the aqueous solution of wetting agent, it is preferred to include in such solution from 5% to 25% by weight of an inert metal salt. Such salts include sodium and potassium chlorides, bromides, sulfates, and phosphates, and alkaline earth metal chlorides such as calcium and magnesium chloride when the wetting agent employed does not form water-insoluble compounds with the metal salts. A freezing point lowering may also be obtained by the addition of water-soluble alcohols such as methyl alcohol, ethyl alcohol, isopropyl alcohol, and ethylene glycol in small amounts, for example, up to about 20% by volume of the aqueous solution.

The immiscible organic solvents which may be employed to dissolve the oil but not the wax at the desired dewaxing temperature include those which in one case are of higher specific gravity than the aqueous solution, and in the other case, of lower specific gravity. The first mentioned category includes halogenated hydrocarbons such as ethylene dichloride and dibromide, chloroform, carbon tetrachloride, ethyl chloride, propyl chloride, ethyl bromide, propyl bromide, trichloroethane, tetrachloroethane, propylene chloride, and trimethylene chloride, amyl bromide, tertiary amyl chloride, butyl chloride, butyl bromide, allyl bromide, BB' dichlorodiethyl ether, chlorobenzene, bromobenzene, O-dichlororbenzene, tetrachloroethylene, tetrafluoroethylene, or mixtures of two or more thereof. The second category is represented by petroleum ether, petroleum naphtha, gasoline, pentane, isopentane, hexane, heptane, octane, benzene, propylbenzene, cumene, amylbenzene, toluene, xylene, and cymene, or mixtures thereof. If the operation is carried out under superatmospheric pressure, the liquified normally gaseous hydrocarbons such as ethane, propane, butane, isobutane and the corresponding olefins, or mixtures thereof, may be used.

Other solvents which may be used are nitrobenzene, furfural, aniline, toluidine, o-aminoethylbenzene, m-aminoethylbenzene, N-methylaniline, 2-chlorophenylamine, 3-chlorophenylamine, N-ethylphenylamine, 1-amino-2 fluorobenzene, p-methoxyaniline, 1-ethoxybutane, methylphenyl ether, benzaldehyde, isopropylmethyl ketone, or mixtures thereof with hydrocarbons such as benzene, toluene, or xylene.

The dewaxing process may be effected at temperatures ranging from 0° F. or lower, up to 100° F. depending upon the choice and amount of aqueous solution and immiscible solvent, the inert metal salt or alcohol added, and the extent to which it is desired to dewax the oil. Temperature control may be accomplished by conventional means such as cooling coils placed in series with the fluid charging pipes, and the vortex separator itself may be insulated, or jacketed with a cooling medium. The volume of solvent used in diluting the waxy oil may range between 1 and 4 to each volume of waxy oil, depending upon the wax content of the oil and the degree of dewaxing desired. The dewaxing operation may be carried out in one or more steps at a constant temperature or in a series of steps at different temperature levels, for example, the waxy oil may be dewaxed in a first stage at 60° F. to separate a relatively high melting wax, and the partially dewaxed oil may then be treated in a second stage at a lower temperature, for example, 20° F. to remove wax of intermediate melting point, and finally at 0° F. to remove the low melting point wax. The process may also be applied to the deoiling of oily waxes such as slack wax containing from 20% to 50% of oil. The waxy oil stocks may be derived from crude petroleum, cracked hydrocarbon oils, selective solvent treated petroleum fractions, oils produced in the Fischer-Tropsch or modified Fischer-Tropsch reaction, oils obtained by the distillation of coals, lignite, and shales, or during the hydrogenation thereof, oils obtained by the polymerization of hydrocarbon gases, or oils produced by the catalytic or thermal condensation of paraffinic, olefinic, aromatic, or hydroaromatic hydrocarbons, or mixtures thereof. The waxy oil stocks may be either distillates or residuums.

The present invention may be further illustrated by the following example, which, however, is not to be construed as limiting the scope thereof.

An aqueous solution was prepared by dissolving 834 pounds of sodium chloride and 44 pounds of a wetting agent per 1000 gallons of water. The wetting agent was a sodium salt of an alkylated benzene sulfonate, the alkyl group averaging about 12 carbon atoms. The waxy oil stock was a paraffin distillate having a Saybolt universal viscosity of 500 seconds at 100° F. and an A. P. I. gravity of 24° containing 20% of wax having a softening point of 164° F. The waxy oil stock was diluted with 3 volumes of ethylene dichloride per volume of stock, and at 70° F. a considerable amount of the crystallized wax remained suspended in the solution.

The aqueous solution at 70° F. was charged tangentially into the upper cylindrical section of a vortex separator such as shown in Figure 1 of the drawing in a volume such that a free falling whirling vortex was formed, the initial angular velocity being approximately 150 R. P. M. The radius of the upper cylindrical section was 6 feet, the radius of the parting tube in the throat was 1 foot, and the height of the vortex from the upper surface to the top of the parting tube was 20 feet. The solution of paraffin distillate containing crystallized wax, at 70° F., was introduced tangentially at the center of the upper cylindrical section at an initial angular velocity of about 150 R. P. M. and formed a layer upon the upper inner surface of the aqueous solution. The volume ratio of aqueous solution to waxy oil solution was 2 to 1. As the vortex whirled downwardly through the separator, the angular velocity and therefore the centrifugal force increased to a value about 325 times the force of gravity at the throat of the separator. During the downward passage, the ethylene dichloride solution of oil and crystallized wax was thrown through the interface of the aqueous solution, most of the crystallized wax being retained in suspension in the aqueous solution, while the oil solution migrated to the periphery of the separator. The oil solution was removed from the separator via the annular space between the throat and the parting tube, while the aqueous solution and crystallized wax were withdrawn through the parting tube. At the dewaxing temperature of 70° F., it was found that 58% of the wax originally contained in the waxy oil stock was thus removed. By operating at a lower temperature or at a higher angular velocity, a substantially greater percentage of wax could be separated. It is to

I claim:

1. A method of dewaxing hydrocarbon oil, which comprises establishing a free falling whirling vortex of an aqueous solution of a wetting agent in a confined zone, superposing upon the surface of said vortex a layer of immiscible organic solvent containing hydrocarbon oil and crystallized wax, imparting to said superposed layer a velocity sufficient to cause the components of said layer to penetrate the surface of the aqueous vortex, passing the solvent and oil through the aqueous solution and retaining the crystallized wax in the aqueous solution, separating the solvent and oil from the aqueous solution containing the crystallized wax, and removing the solvent from the oil, and the wax from the aqueous solution.

2. A method of dewaxing hydrocarbon oil, which comprises establishing a free falling whirling vortex of an aqueous solution of a wetting agent in a confined zone, superposing upon the surface of said vortex a layer of immiscible organic solvent containing hydrocarbon oil and crystallized wax, said organic solvent containing hydrocarbon oil and crystallized wax having a higher specific gravity than said aqueous solution, imparting to said superposed layer a velocity sufficient to cause the components of said layer to penetrate the surface of the aqueous vortex, passing the solvent and oil through the aqueous solution and retaining the crystallized wax in the aqueous solution, separating the solvent and oil from the aqueous solution containing the crystallized wax, and removing the solvent from the oil, and the wax from the aqueous solution.

3. A method of dewaxing hydrocarbon oil, which comprises establishing a free falling whirling vortex of an organic solvent containing hydrocarbon oil and crystallized wax, superposing upon the surface of said vortex a layer of an immiscible aqueous solution of a wetting agent, said aqueous solution having a specific gravity greater than that of the organic solvent containing hydrocarbon oil and crystallized wax, imparting to said superposed layer a velocity sufficient to cause said layer to penetrate the surface of the organic solvent vortex, passing the aqueous layer through the solvent and abstracting therefrom the crystallized wax but not the oil, separating the solvent and oil from the aqueous solution containing the crystallized wax, and removing the solvent from the oil, and the wax from the aqueous solution.

4. A method of dewaxing hydrocarbon oil, which comprises establishing a free falling whirling vortex of an aqueous solution containing from 0.01% to 2.0% of a wetting agent in a confined zone, superposing upon the surface of said vortex a layer of immiscible organic solvent containing hydrocarbon oil and crystallized wax, the volume ratio of aqueous solution to organic solvent, oil, and wax being between 1 and 10 to 1, imparting to said superposed layer a velocity sufficient to cause the components of said layer to penetrate the surface of the aqueous vortex, passing the solvent and oil through the aqueous solution and retaining the crystallized wax in the aqueous solution, separating the solvent and oil from the aqueous solution containing the crystallized wax, and removing the solvent from the oil, and the wax from the aqueous solution.

5. A method of dewaxing hydrocarbon oil, which comprises establishing a free falling whirling vortex of an aqueous solution containing from 0.01% to 2.0% of a wetting agent and from 5% to 25% of an inert, soluble metal salt in a confined zone, superposing upon the surface of said vortex a layer of immiscible organic solvent containing hydrocarbon oil and crystallized wax, the volume ratio of aqueous solution to organic solvent, oil, and wax being between 1 and 10 to 1, imparting to said superposed layer a velocity sufficient to cause the components of said layer to penetrate the surface of the aqueous vortex, passing the solvent and oil through the aqueous solution and retaining the crystallized wax in the aqueous solution, separating the solvent and oil from the aqueous solution containing the crystallized wax, and removing the solvent from the oil, and the wax from the aqueous solution.

6. A method of dewaxing hydrocarbon oil, which comprises tangentially introducing into the upper portion of a confined zone an aqueous solution of a wetting agent, forming a free falling whirling vortex of said aqueous solution, tangentially introducing into the upper portion of said confined zone inwardly of the vortex of said aqueous solution an immiscible organic solvent containing hydrocarbon oil and crystallized wax, superposing upon the upper inner surface of said vortex a layer of said immiscible organic solvent containing hydrocarbon oil and crystallized wax, imparting to said superposed layer a velocity sufficient to cause the components of said layer to penetrate the surface of the aqueous vortex, passing the solvent and oil through the aqueous solution and retaining the crystallized wax in the aqueous solution, withdrawing the organic solvent and oil accumulating adjacent the periphery of the lower portion of said confined zone, and separately withdrawing the aqueous solution and wax from the lower portion of said zone.

7. A method of dewaxing hydrocarbon oil, which comprises tangentially introducing into the upper portion of a confined zone an aqueous solution containing a wetting agent, and an immiscible organic solvent containing oil and crystallized wax, forming a free falling whirling vortex the velocity of which is sufficient to cause the solvent and oil to pass radially outwardly through the aqueous solution leaving the crystallized wax suspended in the aqueous solution, and separately withdrawing from the lower portion of said confined zone, the aqueous solution containing the crystallized wax, and the organic solvent containing the oil.

8. A method of dewaxing hydrocarbon oil, which comprises tangentially introducing into the upper portion of a confined zone an aqueous solution containing a wetting agent and an inert, soluble alkali metal salt, and ethylene dichloride containing oil and crystallized wax, forming a free falling whirling vortex the velocity of which is sufficient to cause the ethylene dichloride and oil to pass radially outwardly through the aqueous solution leaving the crystallized wax suspended in the aqueous solution, and separately withdrawing from the lower portion of said confined zone, the aqueous solution containing the crystallized wax, and the ethylene dichloride containing the oil.

JAMES B. HUNTER.

(References on following page)

REFERENCES CITED

The following references are of record in the file of this patent:

UNITED STATES PATENTS

| Number | Name | Date |
|---|---|---|
| 762,866 | Allen | June 21, 1904 |
| 1,411,782 | Hall | Apr. 4, 1922 |
| 1,701,942 | Andrews | Feb. 12, 1929 |
| 1,825,157 | Pardee | Sept. 29, 1931 |
| 1,930,479 | Jones | Oct. 17, 1933 |
| 2,041,885 | Walch | May 26, 1936 |

OTHER REFERENCES

"The Condensed Chemical Dictionary," Third Edition, published by Reinhold Publishing Corp., New York, 1942, pages 267 and 673.